(12) United States Patent
Uchida

(10) Patent No.: US 6,253,602 B1
(45) Date of Patent: Jul. 3, 2001

(54) METHOD FOR CORRECTING THE VEHICLE G SENSOR OUTPUT VALUE AND FOR DETECTING G SENSOR FAILURE

(75) Inventor: Kazuma Uchida, Hamakita (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/216,846

(22) Filed: Dec. 21, 1998

(30) Foreign Application Priority Data

Dec. 24, 1997 (JP) .................................................... 9-366452
Dec. 26, 1997 (JP) .................................................... 9-368932

(51) Int. Cl.[7] ................................................ G01M 19/00
(52) U.S. Cl. ................................................ 73/118.1
(58) Field of Search ................................ 73/116, 117.2, 73/117.3, 118.1, 1.13, 1.37; 701/29, 30, 31, 34, 35, 124

(56) References Cited

U.S. PATENT DOCUMENTS

| | | | |
|---|---|---|---|
| 5,307,274 | * | 4/1994 | Takata et al. .................... 364/426.01 |
| 5,526,263 | * | 6/1996 | Tanaka et al. ................... 364/426.01 |
| 5,570,288 | * | 10/1996 | Badenoch et al. .............. 364/424.05 |
| 5,696,677 | * | 12/1997 | Leaphart et al. .............. 364/424.046 |
| 5,857,160 | * | 1/1999 | Dickinson et al. ..................... 701/41 |
| 5,895,433 | * | 4/1999 | Chen et al. ............................. 701/41 |

\* cited by examiner

*Primary Examiner*—George Dombroske
(74) *Attorney, Agent, or Firm*—Arent Fox Kintner Plotkin & Kahn, PLLC

(57) ABSTRACT

A method for correction of the G sensor output of a vehicle. The method is for a vehicle equipped with a G sensor, a wheel speed sensor to detect the rotational speed of a wheel of the vehicle, and an electronic control device conducting computations from the signals received from the G sensor and the wheel speed sensor. The method includes steps of determining the acceleration/deceleration at every predetermined time and the G sensor output value, determining the G sensor zero point from the G sensor output value, and determining the current G sensor zero point based on the G sensor zero point which is determined before the predetermined time.

10 Claims, 6 Drawing Sheets

_US 6,253,602 B1_

METHOD FOR CORRECTING THE VEHICLE G SENSOR OUTPUT VALUE AND FOR DETECTING G SENSOR FAILURE

BACKGROUND OF THE INVENTION

This invention relates to a method for correcting the G sensor output value and a method for detecting G sensor failure for a G sensor equipped on a vehicle.

A zero point of G sensor is set with a presumption that the vehicle is in a horizontal condition and is not subject to different slopes of the road on which the vehicle is driving. Accordingly, when the vehicle is on a decline, the force sensed by the G sensor appears more to the deceleration than the actual G. This over-effectuates antilock brake control, which tends to cause malfunctioning of traction control. On the other hand, when the vehicle is on an incline, this under-effectuates antilock brake control, and the traction control does not function. In addition, the antilock brake control and the traction control are set to avoid any malfunctioning, which prevents precise brake control fully utilizing a G sensor.

Further, even if the vehicle is in the same acceleration/deceleration, as in FIG. 6, the G sensor can output different values under various conditions. For instance, the G sensor output value may be different depending upon the voltage value of the source voltage applied to the G sensor or the output value may be different depending on the mounting condition of the G sensor.

OBJECTS OF THE INVENTION

An object of this invention is to provide an effective use of a G sensor for the vehicle.

Another object of this invention is to correct the zero point of the G sensor based on the road conditions.

A further object of this invention is to determine the acceleration/deceleration of the vehicle utilizing the G sensor. A still further object of this invention is to detect G sensor failures.

This invention is a method for correcting a G sensor output value for a vehicle, the vehicle including a G sensor, a wheel speed sensor determining a wheel rotational speed, and an electronic control device receiving signals from the G sensor and wheel speed sensor and computing therefrom, wherein the method comprises the steps of: determining the zero point of the G sensor from wheel acceleration/deceleration and an output value of the G sensor at every predetermined time and determining the current zero point of the G sensor based on the zero point of the G sensor determined prior to the predetermined time.

This invention further is a method for correcting the G sensor output value as above, wherein the method further comprises a step of determining the current zero point of the G sensor from the zero point of the G sensor determined last and the zero point of the G sensor determined prior to said predetermined time.

This invention still further is a method for correcting the G sensor value as above, wherein the method further comprises a step of determining the zero point of G sensor by applying a wheel acceleration/deceleration, and a G sensor output value in the formula, i.e., Zero Point of G Sensor=(Wheel Acceleration/Deceleration)/Slope Coefficient+G Sensor Output Value.

This invention still further is a method for correcting the G sensor output value as above, wherein the method further comprises a step of determining the zero point of the G sensor in case of the difference between a wheel with the maximum wheel speed and a wheel with the minimum wheel speed being less than a predetermined value.

This invention still further is a method for correcting the G sensor output value as above, wherein the G sensor output value is an average value determined within a predetermined short period of time and the wheel acceleration is the average wheel acceleration within the predetermined short period of time.

This invention still further is a method for determining acceleration/deceleration of a vehicle, which vehicle includes a G sensor, a wheel speed sensor determining wheel rotational speed, and an electronic control device receiving signals from the G sensor and wheel speed sensor and performing calculations therewith, the method comprising the steps of: determining wheel acceleration/deceleration and the G sensor output value at every predetermined interval, determining the differences of the wheel acceleration before and after the predetermined interval and the differences of the G sensor output value, determining the slope coefficient for the G sensor based on the ratio of the differences, and determining the vehicle acceleration/deceleration from the G sensor output value as modified by the slope coefficient.

This invention still further is a method for determining acceleration/deceleration of a vehicle as above, wherein the method further comprises the steps of: determining the maximum wheel speed and minimum wheel speed at each vehicle wheel and determining the slope coefficient of the G sensor in case that the speed difference between the maximum and minimum wheel speeds is less than a predetermined value.

This invention still further is a method for determining acceleration/deceleration of a vehicle as above wherein the G sensor output value is an average value determined within the predetermined interval.

This invention still further is a method for determining acceleration/deceleration of a vehicle as above, wherein the method further comprises a step of determining a slope coefficient in case that the G sensor output value before and after the predetermined interval or the absolute value of the wheel acceleration/deceleration difference is larger than a predetermined value.

This invention still further is a method for detecting the G sensor failure for a vehicle, which vehicle includes a G sensor, a wheel sensor determining wheel rotational speed, and an electronic control device receiving signals from the G sensor and wheel speed sensor and performing calculations therewith, wherein said method comprises the steps of: determining a wheel acceleration/deceleration and a G sensor output value at every predetermined interval, determining the differences of the wheel acceleration/deceleration before and after the predetermined interval, determining the differences of the G sensor output value, determining the slope coefficient for the G sensor based on the ratio of the differences, and detecting G sensor failure when the slope coefficient is determined to be outside of a predetermined value range.

This invention yet further is a method for detecting the G sensor failure for a vehicle, which vehicle includes a G sensor, a wheel speed sensor determining wheel rotational speed, and an electronic control device receiving signals from the G sensor and wheel speed sensor and conducting a computation, wherein the method comprises the steps of: determining a value at a zero point of the G sensor by a low pass filter when the value of the zero point of G sensor is approximately same as an absolute value determined by the G sensor and a vehicle speed is larger than a predetermined value and detecting the G sensor failure in case of the value determined by the low pass filter is not within a predetermined value range.

BRIEF DESCRIPTION OF THE DRAWINGS

This above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
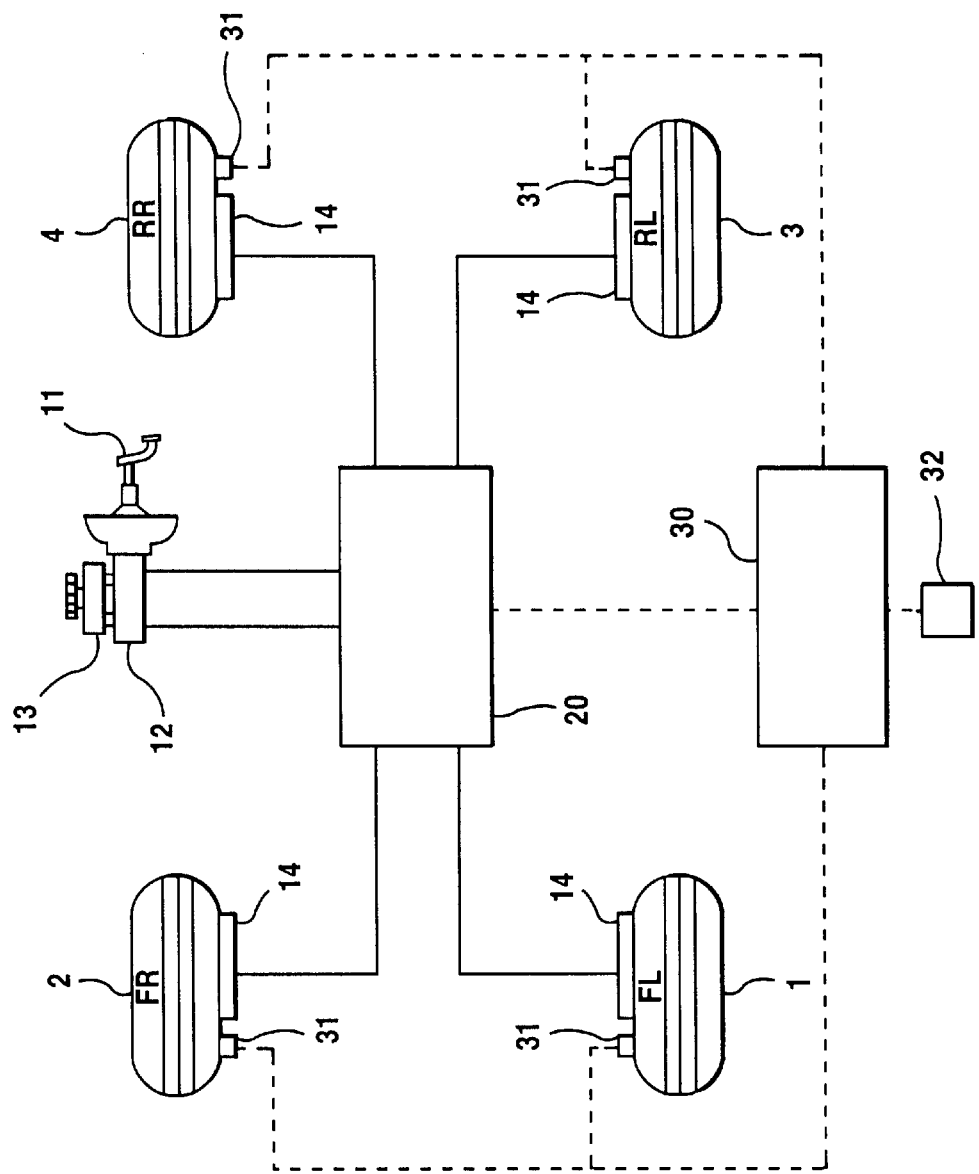
FIG. 1 is an explanation view of the vehicle brake line.

The embodiments of this invention are explained with reference to the drawings as follows:

A vehicle control device determines the wheel speed, wheel acceleration/deceleration values, and the estimated vehicle speed, for example, in a brake control device such as shown in FIG. 1. The vehicle control device is equipped with an electronic control device 30 which sends commands such as for brake control and a hydraulic unit 20 which operates based on the control commands from the electronic control device 30. In the hydraulic unit 20, a channel, through which the hydraulic pressure created at the brake pedal 11, the main reservoir 13, and the master cylinder 12 passes, is connected to the wheel brake 14 of the respective wheel (front left wheel 1, front right wheel 2, rear left wheel 3, and rear right wheel 4) via the hydraulic unit 20.

The respective rotational speed of each of the wheels 1–4 is determined by a wheel speed sensor 31, producing a signal which is input in the electronic control device 30, and which is used for determining the wheel acceleration/deceleration. In addition, signals from the G sensor 32 are input in the electronic control device 30 to determine the vehicle acceleration/deceleration. The electronic control device 30 may comprise an exclusive hard wired device or a general determining device such as a microcomputer.

Figure 2A:
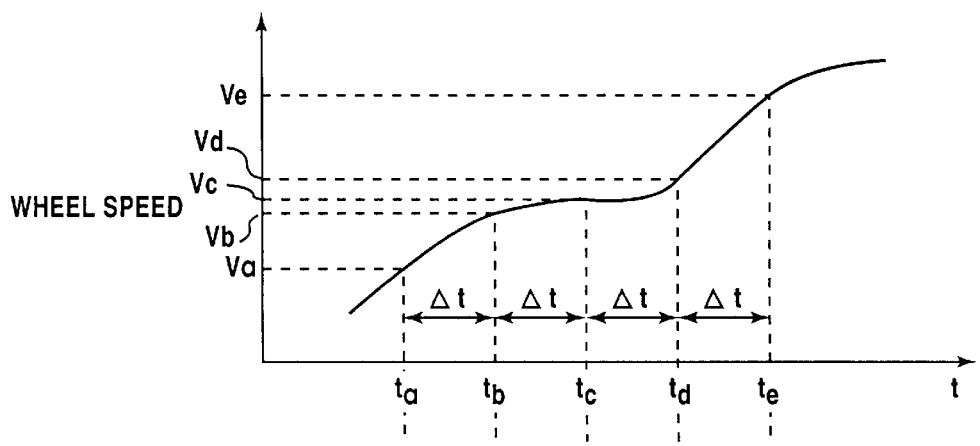
FIG. 2 is an explanation graph showing the relationships of wheel speed, acceleration/deceleration, and the G sensor output value.

The wheel speed of the respective wheel is determined based on signals from the respective wheel speed sensor 31. The wheel speed graph of FIG. 2 shows variations of the wheel speed of one wheel. In FIG. 2(A), the wheel speed at the time ta is Va. Then, the wheel is accelerated, and the wheel speed becomes Vc at the time tb after a predetermined short time Δt. Further, the wheel speed becomes Vc at the time tc after another predetermined short time Δt.

Figure 2B:
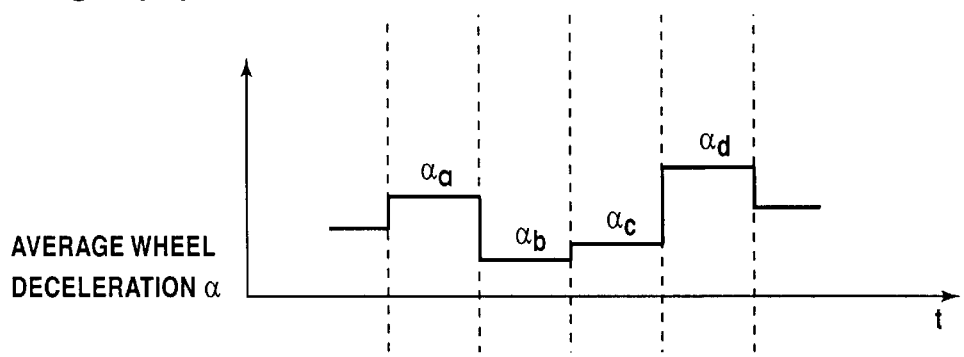
Figure 2C:
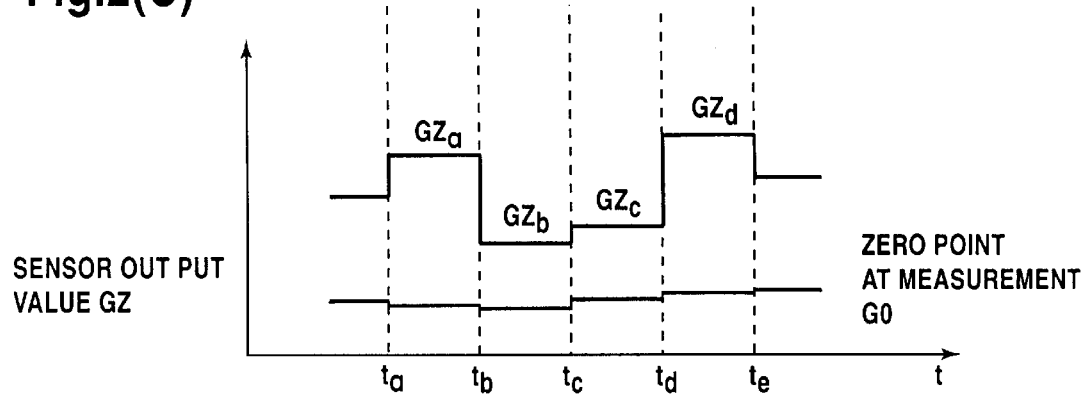

In FIG. 2(B), by determining the average of the wheel speed variations over the predetermined short time Δt, the average of the wheel acceleration/deceleration speed is determined. The average acceleration/deceleration αa of the short time Δt from the time ta to the time tb may be determined, and the average acceleration/deceleration αb, αc, may be determined.

A G sensor is provided to determine the vehicle acceleration/deceleration in the longitudinal direction of the vehicle. An output value of the G sensor eliminates harmful or possible erroneous effects such as those generated by vehicle vibration by averaging over the short time Δt. The average output value GZa of the G sensor at the short time Δt from the time ta to the time tb is determined, and the average output values GZb, GZc, . . . of the G sensor are determined.

The zero point of G sensor (G output value, when the vehicle acceleration/deceleration in the longitudinal direction of the vehicle is zero) varies depending upon the slope on which the vehicle drives. While a vehicle is driving, the variation of zero point may almost be ignored over the predetermined short time Δt with less slope variations. Then, in a normal driving, this predetermined short time may be, for example, 0.5 second.

The relationships between the average acceleration/deceleration and the G sensor output value may be illustrated by the following formula 2. Here, the average wheel acceleration/deceleration is α; the G sensor output value is GZ; the zero point of G sensor is G0; and the proportional coefficient (hereinafter the slope coefficient) is K. The slope coefficient K varies based on the G sensor characteristics and the G sensor assembly condition, once determined, however, it does not vary based on the vehicle driving condition.

Accordingly, once the slope coefficient K is recognized, the G sensor zero point G0 may be determined by the formula 2 from the average wheel acceleration/deceleration α and the G sensor output value GZ.

Average Acceleration and Deceleration $\alpha = K(G0 - GZ)$   Formula 2:

An example of determining the slope coefficient K is explained next.

Figure 3A:
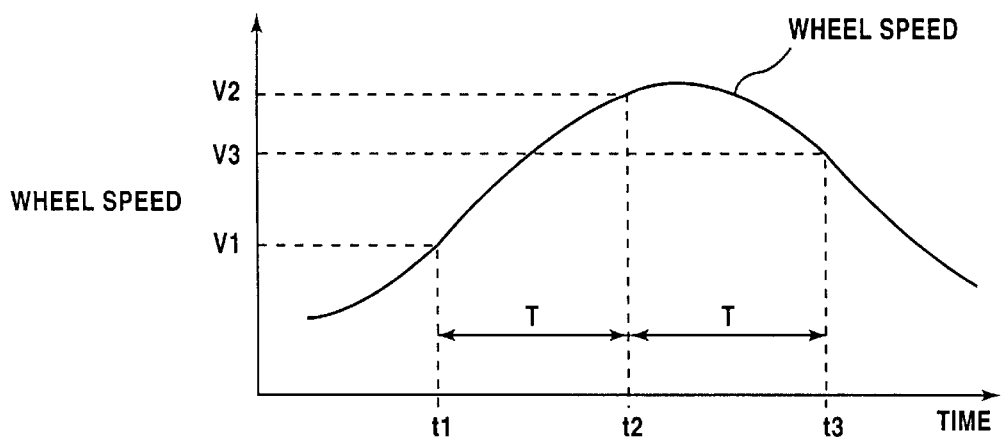
FIG. 3 is an explanation graph showing the average of the wheel speed and the G sensor output value.

The wheel speed graph of FIG. 3(A) illustrates the wheel speed variation of one wheel. The wheel speed at the time t1 is V1. Then the wheel is accelerated for the speed to become the wheel speed V2 at the time t2 after the predetermined time T. As a result, the wheel undergoes the speed difference (V2−V1) during the predetermined time T. The wheel speed is decelerated as a whole to become the wheel speed V3 after the time t3 after next predetermined time T. As a result, the wheel speed difference becomes (V3−V2) during the predetermined time T.

A G sensor is provided to determine the acceleration/deceleration of the vehicle for in the longitudinal direction of the vehicle. The G sensor output value may eliminate vibration effects of vehicle by taking an average value. This average value, for example, may be an average of the output value determined at the predetermined time T.

Figure 3B:
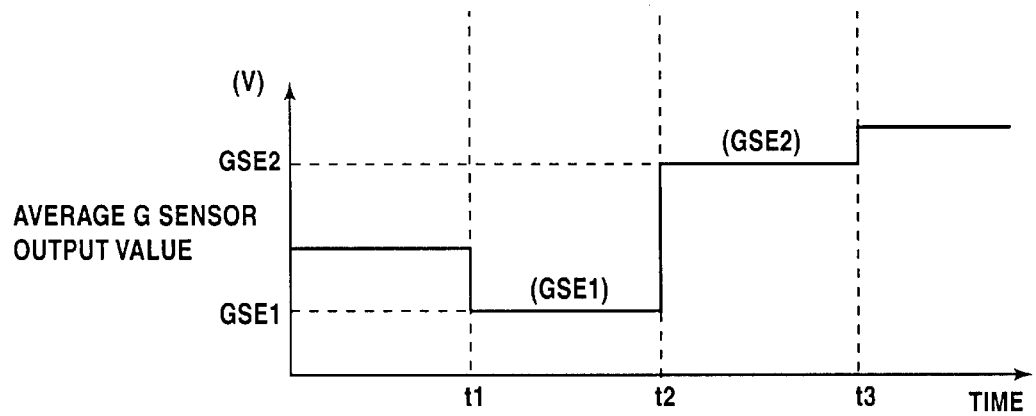

In FIG. 3(B), the G sensor output average value for the predetermined time T from the time t1 to the time t2 may be GSE1, and the G sensor output average value for the predetermined time T from the time t2 to the time t3 may be GSE2.

Here, the predetermined time T is designed to be the time such that the slope while the vehicle is driving is assumed to be constant, e.g., 1.8 seconds. In addition, in this case, the G sensor output average value is, for example, the average of 256 cycles of the measured value complying with the cycle of the electronic control device.

The wheel speed differences (V2−V1) from the predetermined time t1 to the predetermined time t2 is almost in proportion to the wheel acceleration/deceleration over that time. Also, the average G sensor output value is in proportion to the vehicle acceleration/deceleration over that time.

Here, while the vehicle is moving forward and is not slipping, i.e., when the wheel speed equals to the vehicle speed, the following functional formula, Formula 3, may be used relating to the acceleration/deceleration from the predetermined time t1 to the predetermined time t2. Further, when the vehicle acceleration/deceleration are zero, the value (G0−GSE1) deducting the average value GSE1 from the G sensor output value G0 (zero point output value) shows the actual vehicle acceleration/deceleration. Thus, this value is applied in the formula. The reference sign K is the proportional coefficient of the wheel speed differences and the vehicle acceleration/deceleration, and it may be called a slope coefficient. Formula 4 is a functional formula from the next time t2 to the predetermined time t3. The above functions, Formula 3 and Formula 4, are used to determine the function in Formula 5. Determining the absolute value from the functional formulas enables the inclusion of both cases when the vehicle is moving forward and backward. In addition, the differences in the G sensor output value or the wheel acceleration/deceleration are determined when the differences are larger than the predetermined value. When the G sensor output value is smaller than the predetermined value, the differences affects and no computation is conducted.

Here, the zero point output value G0 is assumed to be almost equal at Formula 3 and Formula 4. For this assumption to be established, the slope of the road on which the vehicle is driving should almost be without varying.

$$V2-V1=K(G0-GSE1) \quad \text{Formula 3}$$

$$V3-V2=K(G0-GSE2) \quad \text{Formula 4}$$

$$K=\text{absolute value of } (V3+V1-2V2)/\text{absolute value of } (GSE1-GSE2) \quad \text{Formula 5}$$

In the following section, the zero point (GSORG) of the sensor used for the actual brake control is determined.

Figure 4:
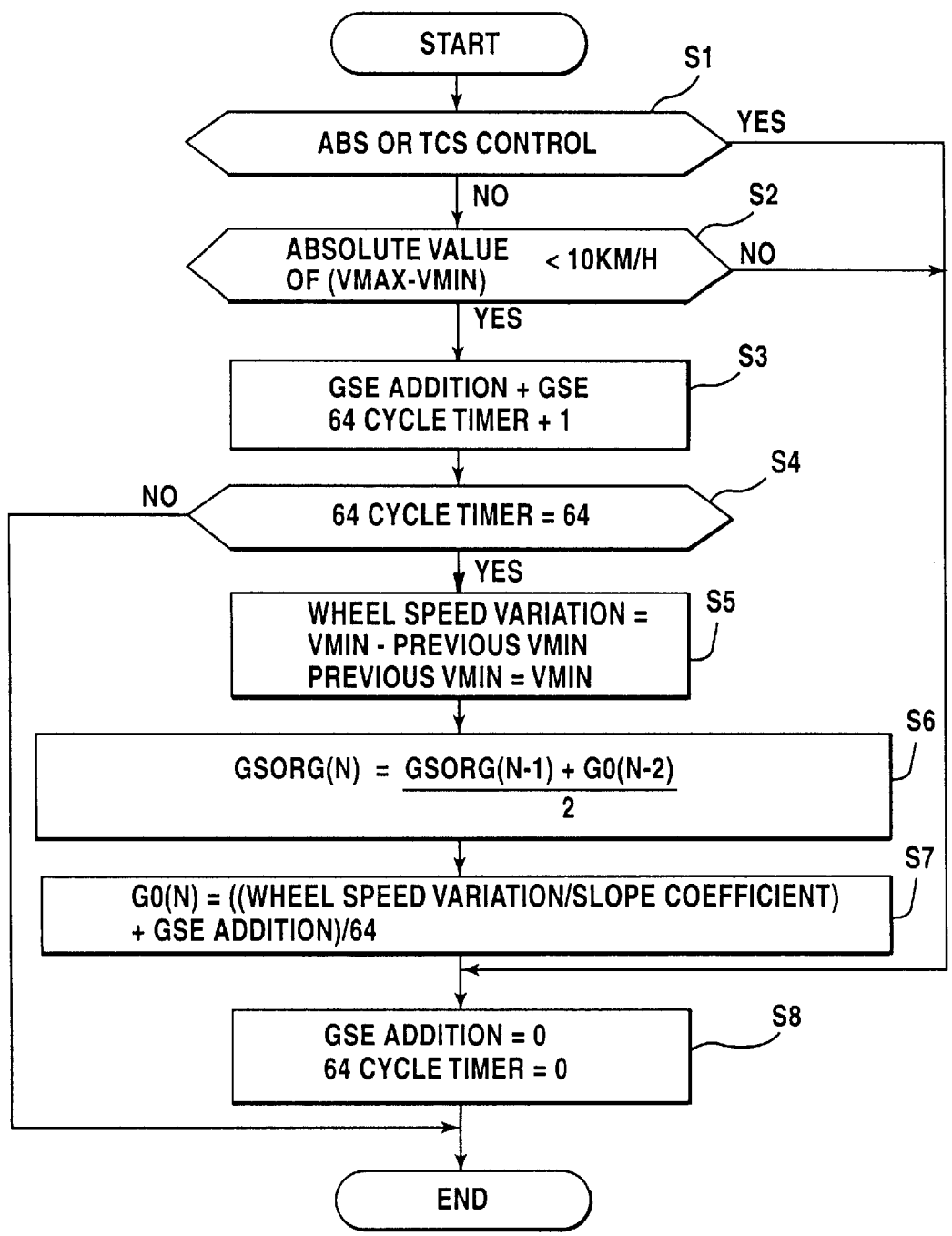
FIG. 4 is a flowchart for determining the zero point for the G sensor control.

For instance as shown in FIG. 4, in determining the zero point of G sensor, there assumed to be no slippage since the relation between the wheel speed and the G sensor output value is broken when the wheels are slipping. With this assumption, the zero point is determined by checking whether an antilock brake system (ABS) or a traction control system (TRC) is in fact being used (S1). If the brake control is in operation, the following steps, i.e., steps from step S2, are not conducted. Further, the computation proceeds by checking whether the absolute value of the difference between the maximum vehicle speed (VMAX) and the minimum vehicle speed (VMIN) is smaller than a predetermined value, e.g., less than 10 kilometer per hour. If it is above the predetermined value, the system detects slip and stops the following steps, i.e. steps from step S3, are not conducted (S2).

If no slip is detected, as shown in FIG. 4, the G sensor output value is to be averaged (GSE), for example, by accumulating every cycle of 64 cycles. After the accumulation, the wheel speed variation, for example, the variation relating to the minimum wheel speed is determined (S5). Then, for example, the current zero point of the G sensor (GSORG) is determined (S6) by the previous zero point of the G sensor GSORG (N−1) and the zero point before the above-previous zero point G0 (N−2) (determined by S7) determined in Formula 7. By using this zero point of the G sensor, the vehicle acceleration/deceleration of G sensor output value is accurately determined. Further, by determining the current zero point of the G sensor (GSORG (N)) from the previous zero point of G sensor GSORG (N−1) and the zero point before the above-previous zero point G0 (N−2), a slight wheel slip may be detected without the zero point of the G sensor being dragged by a slow wheel slip. After determining the current zero point of G sensor, the zero point after next zero point G0 is determined (S7).

Accordingly, the functional formulas as in Formula 7 and Formula 6 may be determined. In addition, K represents the slope coefficient, and GSE represents the G sensor output value.

$$\text{Minimum Wheel Speed variation during 64 Cycles=Accumulation of Every Cycle of 64 Cycles } (K(G0-GSE)) \quad \text{Formula 6}$$

$$G0=(\text{Minimum Wheel Speed Variation during 64 Cycles}/K+\text{Accumulation of Every Cycle of 64 Cycles } (GSE))/64 \quad \text{Formula 7}$$

A method of determining the wheel acceleration/deceleration and the estimated vehicle speed is described next.

After determining the slope coefficient K and the zero point output value of the G point G0, the wheel speed variation, i.e. wheel acceleration/deceleration, is determined from the G sensor output by the functional formula in Formula 3.

When switching a normal tire to a mini tire with a smaller diameter, the slope coefficient appropriate to the mini tire is determined, which automatically provides the accurate wheel acceleration/deceleration.

In an antilock brake control system (ABS) and a traction control system (TCS) for a four wheel drive vehicle, using the G sensor enables the estimated vehicle speed to be determined even when the four wheels slip simultaneously. Especially in TCS, since the threshold value that initiates control is small, i.e., from 0.5 km/h to 5 km/h, a highly accurate determination of the estimated vehicle speed is possible.

In order to determine the estimated vehicle speed, the acceleration/deceleration (=K×G sensor output value) is determined from the G sensor voltage and the slope coefficient K based on the zero point voltage of the G sensor and then accumulated to determine the estimated vehicle speed sequentially.

A method for detecting the G sensor failure from the slope coefficient K is explained next.

The slope coefficient K determined by the electronic control device has the output sensitivity range of ±10 percent relating to the nominal value because of the G sensor property. In addition, provided that difference in the outside diameter of the tire is ±10 percent relative to a normal tire, the slope coefficient N varies ±20 percent as a whole.

Provided that the G sensor failure is more than 20 percent relative to the nominal value and that the G sensor inclines 45 degrees toward up and down and right and left, the G sensor output value decreases 75 percent to be detectable. Similarly, a failure of the G sensor internal circuit including when the G sensor output value being fixed (same as being inclined 90 degrees) may be detected.

Accordingly, if the coefficient value K differs more than ±20 percent, as the determined value of the slope coefficient K, G sensor failure can thereby be recognized.

For instance, when the G sensor output value is fixed and the vehicle is gradually accelerated, the output from the G sensor does not vary. Therefore, if the determined value of the slope coefficient K becomes greater, failure is detected upon the slope coefficient reaching positive 20 percent over the nominal value.

A method for detecting the G sensor failure by the zero point is disclosed next.

The zero point of the G sensor may be determined by a low pass filter with a long time constant (for example, 6 seconds) to eliminate effects of a slope to estimate the road surface inclination as being zero (GREF). Variations of the zero point when the vehicle is on zero inclination are considered in advance as design tolerances (tolerances of the installation and the G sensor itself). Thus, the G sensor failure may be detected when the value of GREF is not within a predetermined range.

Figure 5:
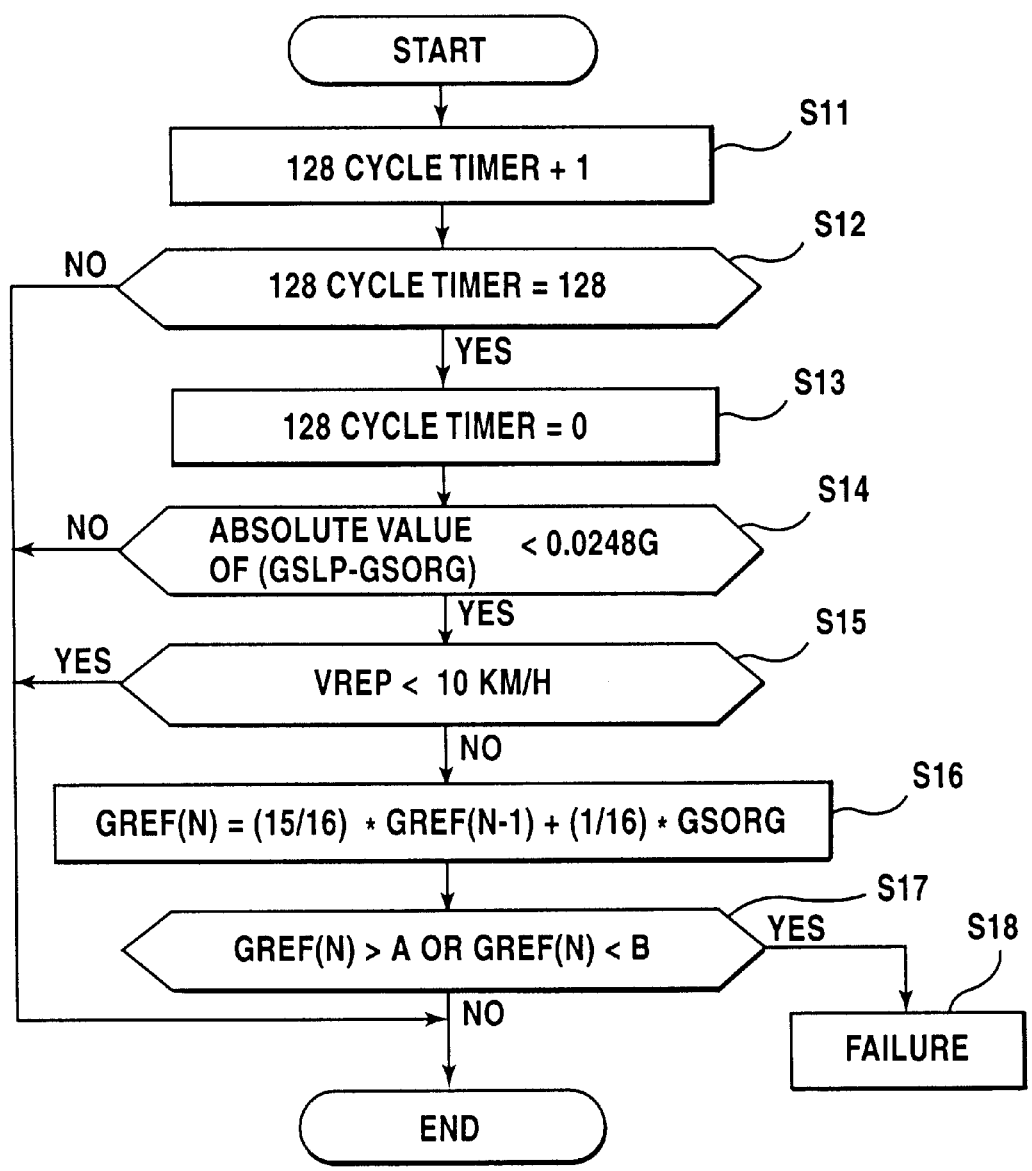
FIG. 5 is a flowchart for detecting G sensor failure.
Figure 6:
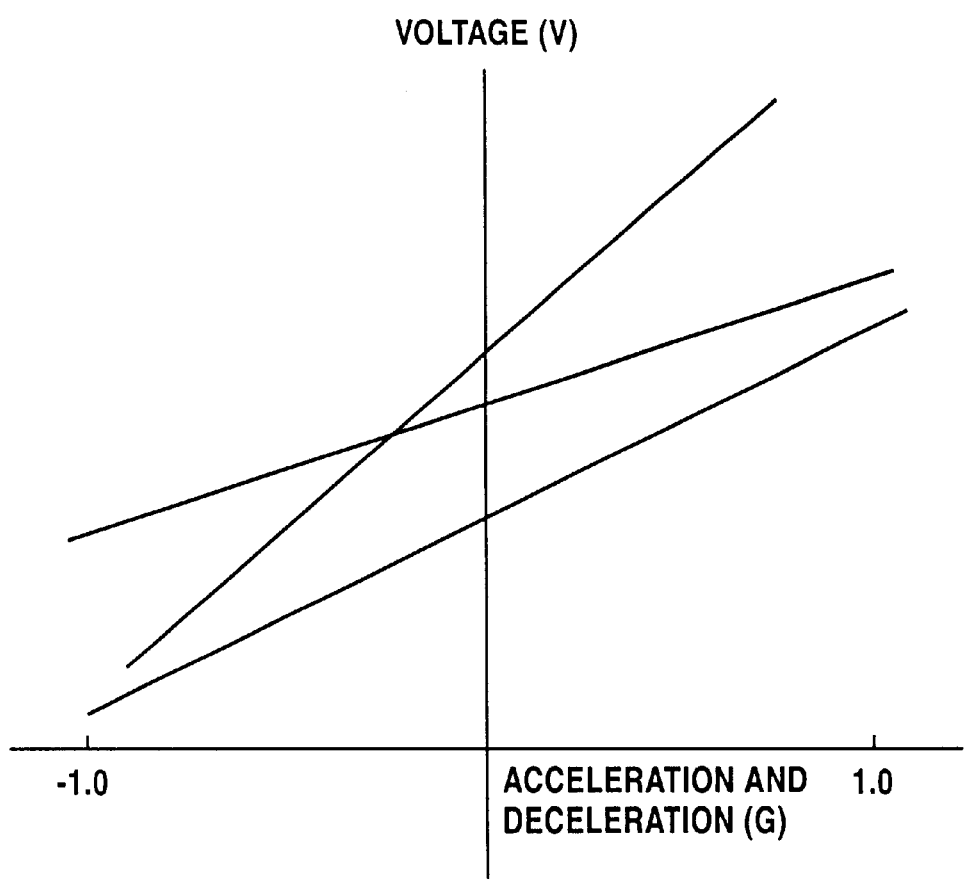
FIG. 6 is an explanation view showing the relationships between the acceleration/deceleration and the G sensor output value.

In FIG. 5, an approximate average is determined by waiting 128 cycle time at the step S11 to the step S13 and determining the measured value of G sensor processed through the zero point of G sensor (GSORG) and a low pass filter. This process determines whether the vehicle is accelerating. Next, to avoid the situation that the vehicle is parking on a slope, the method checks whether the estimated vehicle speed VREF is less than the predetermined value, e.g., 10 km/h (S15). When the vehicle is hardly accelerated and the vehicle speed is more than the predetermined value, the zero point of the G sensor for control (GSORG) is processed by the low pass filter, and the estimated zero point of the G sensor (GREF) is determined (S16). When the estimated zero point of the G sensor is out of the design predetermined value range of the G sensor (maximum value A=nominal value of the zero point in the design (2.3 B)+the design tolerance (0.2 G)+slope (0.3 G)) (minimum value B=nominal value of the zero point in the design (2.3V)−design tolerance (0.2 G)−slope (0.3 G)), the G sensor failure is reported e.g. through a display.

This invention has the following advantages:

This invention enables the continuous computation of the zero point of the G sensor by a rather simple method.

Since the zero point may be determined continuously, the vehicle acceleration/deceleration may be accurately determined from the G sensor output value. As a result, the G sensor is sufficiently used to conduct a precise control.

The slope coefficient K detects any deviation from the nominal value, and the G sensor failure may be easily detected.

The G sensor failure may easily be detected from the zero point of the G sensor.

To detect the current G sensor zero point, by using the G sensor zero point before the predetermined time, e.g. one second, the G sensor zero point may not be dragged by a slow slip, thereby enabling a precise slip detection and control.

It is readily apparent that the above-described has the advantage of wide commercial utility. It should be understood that the specific form of the invention hereinabove described is intended to be representative only, as certain modification within the scope of these teachings may be apparent to those skilled in the art.

Accordingly, reference should be made to the following claims in determining the full scope of the invention.

What I claim is:

1. A method for correcting a G sensor output value for a vehicle, the vehicle including a G sensor, a wheel speed sensor determining wheel rotational speed for a wheel of the vehicle, and an electronic control device receiving signals form the G sensor and the wheel speed sensor and conducting computations therefrom, the method comprising the steps of:

determining the zero point of the G sensor from wheel acceleration/deceleration and an output value of the G sensor for each predetermined cycle; and determining a current zero point of the G sensor for a current cycle based on the zero point of the G sensor determined in a cycle prior to the current cycle and the zero point of the G sensor determined in a cycle prior to said cycle prior to the current cycle.

2. A method for correcting the G sensor output value claimed in claim 1, wherein the method further comprises a step of:

determining the zero point of the G sensor by applying to the wheel acceleration/deceleration and the G sensor output value, the formula, Zero Point of G Sensor= (Wheel Acceleration/Deceleration)/Slope Coefficient+G Sensor Output Value.

3. A method for correcting the G sensor output value as claimed in claim 1, wherein the method further comprises a step of:

determining the zero point of the G sensor only when the difference between the wheel speed of a wheel with the maximum wheel speed and the wheel speed of a wheel with the minimum wheel speed is less than a predetermined value.

4. A method for correcting the G sensor output value as claimed in claim 1, wherein the G sensor output value is an average value determined within a predetermined short period of time and the acceleration/deceleration is an average acceleration/deceleration within the predetermined short period of time.

5. A method for determining acceleration/deceleration of a vehicle, the vehicle including a G sensor, a wheel speed sensor determining wheel rotational speed, and an electronic control device receiving signals from the G sensor and the wheel speed sensor and conducting computations, wherein the method comprises the steps of:

determining the wheel acceleration/deceleration and a G sensor output value at every predetermined interval, determining the differences of the wheel acceleration/deceleration before and after the predetermined interval and the differences of the G sensor output value, determining the slope coefficient for the G sensor based on the ratio of the differences, and determining the vehicle acceleration/deceleration from the G sensor output value modified by the slope coefficient.

6. A method for determining acceleration/deceleration of a vehicle as claimed in claim 5, wherein the method further comprises the steps of:

determining maximum wheel speed and minimum wheel speed at every vehicle wheel and determining the slope coefficient of the G sensor whenever the speed difference between said maximum and minimum wheel speeds is less than a predetermined value.

7. A method for determining acceleration/deceleration of a vehicle as claimed in claim 5, wherein the G sensor output value is an average value determined within the predetermined interval.

8. A method for determining acceleration/deceleration of a vehicle as claimed in claim 5, wherein the method further comprises the step of:

determining a slope coefficient when the G sensor output value before and after the predetermined interval or the absolute value of the wheel acceleration/deceleration difference is larger than a predetermined value.

9. A method for detecting the G sensor failure for a vehicle, the vehicle including a G sensor, a wheel speed sensor determining wheel rotational speed and an electronic control device receiving signals from the G sensor and the wheel speed sensor and conducting computations, wherein the method comprises the steps of:

determining a wheel acceleration/deceleration and a G sensor output value at every predetermined interval, determining differences of the wheel acceleration/deceleration before and after the predetermined interval, determining the differences of the G sensor output value, determining the slope coefficient of the G sensor based on the ratio of the differences, and detecting the G sensor failure whenever the slope coefficient is determined to be outside a predetermined value range.

10. A method for detecting the G sensor failure for a vehicle, the vehicle including a G sensor, a wheel speed G sensor determining wheel rotation speed, and an electronic control device receiving signals from the G sensor and the wheel speed sensor and conducting computations, wherein the method comprises the steps of:

determining a value at the zero point of the G sensor processed by a low pass filter when the value of the zero point of the G sensor is approximately same as the absolute value determined by the G sensor and a vehicle speed is larger than a predetermined value and detecting said G sensor failure in case of said value determined by the low pass filter is not within a predetermined value range.

* * * * *